(12) United States Patent
Bonnin

(10) Patent No.: US 8,434,870 B2
(45) Date of Patent: May 7, 2013

(54) METHOD AND APPARATUS FOR SIMULATING AN OPTICAL EFFECT OF AN OPTICAL LENS

(75) Inventor: Thierry Bonnin, Charenton-le-Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 54 days.

(21) Appl. No.: 13/141,693

(22) PCT Filed: Dec. 18, 2009

(86) PCT No.: PCT/EP2009/067600
§ 371 (c)(1),
(2), (4) Date: Sep. 16, 2011

(87) PCT Pub. No.: WO2010/072692
PCT Pub. Date: Jul. 1, 2010

(65) Prior Publication Data
US 2012/0002168 A1  Jan. 5, 2012

(30) Foreign Application Priority Data
Dec. 22, 2008 (EP) .................................... 08306000

(51) Int. Cl.
*A61B 3/02* (2006.01)
*A61B 3/00* (2006.01)

(52) U.S. Cl.
USPC ............................ 351/222; 351/233; 351/246

(58) Field of Classification Search .................. 351/222, 351/233, 246
See application file for complete search history.

(56) References Cited

FOREIGN PATENT DOCUMENTS

| | | |
|---|---|---|
| EP | 0 810 427 | 12/1997 |
| EP | 0 950 887 | 10/1999 |
| WO | WO 2007/056795 | 5/2007 |

*Primary Examiner* — Jack Dinh
(74) *Attorney, Agent, or Firm* — Cozen O'Connor

(57) ABSTRACT

A method of simulating an optical effect of an optical lens for a potential wearer, the method comprising: using a first camera to take a first image of a scene through a first optical lens, the first optical lens having optical characteristics according to a first ophthalmic lens design, the first camera being provided with optics arranged to simulate the optical characteristics of a human eye; and displaying the first image on a display device for viewing by the potential wearer enabling the potential wearer to visualise the optical effects of the first optical lens on his viewing ability. The position of the first camera, the first optical lens and the display device are fixed with respect to a referential frame defined by the head of the potential wearer, the head of the potential wearer being movable with respect to the scene.

17 Claims, 5 Drawing Sheets

US 8,434,870 B2

METHOD AND APPARATUS FOR SIMULATING AN OPTICAL EFFECT OF AN OPTICAL LENS

RELATED APPLICATIONS

This is a U.S. National Phase Application under 35 USC 371 of International Application PCT/EP2009/067600 filed on Dec. 18, 2009.

This application claims the priority of European Application No. 08306000.4 filed Dec. 22, 2008, the entire content of which is hereby incorporated by reference.

FIELD OF THE INVENTION

The present invention relates to a method of and an apparatus for simulating an optical effect of an optical lens for a potential wearer.

BACKGROUND OF THE INVENTION

Traditionally prescribing ophthalmic lens to a wearer involves fitting a potential wearer having an eyesight defect with ophthalmic lenses having different optical characteristics and then selecting the lenses which provide the best optical performance for the wearer. Such techniques suffer the drawback that the wearer has to go through the process of putting off and taking off a number of spectacles and may only be exposed to a limited selection of lenses which may not include the optical lens optimal for correcting the particular eyesight defect.

To address such issues various solutions based on virtual reality techniques which simulate the optical effect of an ophthalmic lens have been proposed. For example, WO 2007/056795 describes a method of simulating an optical defect of a selected ophthalmic lens design which includes retrieving simulation data for the selected ophthalmic lens design and processing the simulation data to generate a virtual output image simulating the optical defect.

A drawback of the system described in WO 2007/056795 is that it requires complex data processing techniques and a high calculating power to provide an average quality output image. This leads to prohibitive costs and complex system requirements for implementation of the virtual simulation method.

SUMMARY OF THE INVENTION

Accordingly, one object of the present invention is to provide a method of simulating an optical effect of an optical lens which is more simplified, requiring less complex data processing techniques and less complex systems.

To better address one or more of the foregoing concerns, in accordance with a first aspect of the invention there is provided a method of simulating an optical effect of an optical lens for a potential wearer, the method comprising: using a first camera to take a first image of a scene through a first optical lens, the first optical lens having optical characteristics according to a first ophthalmic lens design, the first camera being provided with optics arranged to simulate the optical characteristics of a human eye; and displaying the first image on a display device for viewing by the potential wearer enabling the potential wearer to visualise the optical effects of the first optical lens on his viewing ability. The position of the second camera, the second optical lens and the first and second screen of the display device are fixed with respect to the referential frame.

In embodiments the method may further include replacing the first optical lens with a further optical lens having optical characteristics according to a further ophthalmic lens design, different to the first ophthalmic lens design; taking a further image of the scene using the first camera through the further optical lens and displaying the further image on the display device for viewing by the potential wearer so that the potential wearer can compare the optical effects provided by the first optical lens with the optical effects provided by the further optical lens. The first image and the further image may be viewed simultaneously or sequentially.

The method may further include providing a combined image including at least a portion of the first image and at least a portion of the further image and displaying the combined image on the display device so that the wearer can compare the visual effects of the first optical lens with the visual effects of the further optical lens in the combined image. The entire first image and further image may be compared with one another or the same portion of the first image and the further image may be compared with one another.

The method may include using a second camera to simultaneously take a second image of the scene through a second optical lens, the second optical lens having optical characteristics according to a second ophthalmic lens design; the second camera being provided with optics arranged to simulate the optical conditions of a human eye such that the first and second camera simulate a pair of human eyes; displaying the first image on a first screen of the display device for viewing by the wearer through a first eye; and displaying the second image simultaneously on a second screen of the display device for simultaneous viewing by the wearer through a second eye, thereby enabling a binocular reconstruction of the first and second images. The position of the second camera, the second optical lens and the first and second screen of the display device are fixed with respect to the referential frame. The second ophthalmic lens design preferably is identical to the first ophthalmic lens design.

In embodiments of the invention the or each camera may take a series of images following the movement of the head of the potential wearer to enable the potential wearer to scan the scene around him through the or each camera.

According to a second aspect of the invention there is provided an apparatus for simulating an optical effect of an optical lens for a potential wearer, the apparatus comprising: a first camera provided with optics arranged to simulate the optical characteristics of a human eye; a first optical lens, the first optical lens having optical characteristics according to a first ophthalmic lens design, the first camera being arranged to take an image of a scene through the first optical lens and being operable to transfer image data to a display device for displaying the image for viewing by the potential wearer such that the potential wearer can visualise the effects of the first optical lens on his viewing ability. The position of the second camera, the second optical lens and the first and second screen of the display device are fixed with respect to the referential frame.

The apparatus may include a further optical lens having optical characteristics according to a further design different to the first design; and a support for positioning the first optical lens or, alternatively, the further optical lens between the camera and the scene to be imaged.

In particular embodiments of the invention, the apparatus can include an image combiner operable to provide a combined image including at least a portion of the first image and at least a portion of the further image; and the display device may be operable to display the combined image so that the wearer can compare the optical effects provided by the first optical lens with the optical effects of the further optical lens in the combined image.

The apparatus may include a second camera being provided with optics arranged to simulate the optical conditions of a human eye such that the first and second camera simulate a pair of human eyes; a second optical lens having optical characteristics according to a second ophthalmic lens design; the second camera being arranged to simultaneously take a second image of the scene through the second optical lens; the display device may include a first screen for displaying the first image for viewing by the potential wearer through a first eye and a second screen for displaying the second image for simultaneous viewing by the potential wearer through a second eye, thereby enabling a binocular reconstruction of the first and second images. The position of the second camera, the second optical lens and the first and second screen of the display device are fixed with respect to the referential frame.

In embodiments of the invention, the or each camera may be operable take a series of images following the movement of the head of the potential wearer to enable the potential wearer to scan the scene around him through the or each camera.

The or each camera is preferably a video camera. For example, the or each camera may be a CCD type camera.

In an embodiment of the invention the display device may be a head mounted display (HMD) device. In alternative embodiments of the invention the display device may be a portable PC display screen such as a PC tablet, PDA or the like.

Another aspect of the invention relates to a computer program product comprising one or more stored sequences of instructions that is accessible to a processor and which, when executed by the processor, causes the processor to carry out the steps of the different embodiments of the preceding methods.

Another aspect of the invention relates to a computer-readable medium carrying one or more sequences of instructions of the preceding computer program product.

Unless specifically stated otherwise, as apparent from the following description, it is appreciated that throughout the specification discussions utilizing terms such as "computing", "calculating" "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method.

The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the invention will now be described, by way of example only, and with reference to the following drawings in which:—

DETAILED DESCRIPTION

An apparatus for simulating an optical effect of an optical lens according to a first embodiment of the invention will be described with reference to FIGS. 1 to 4B.

Figure 1:
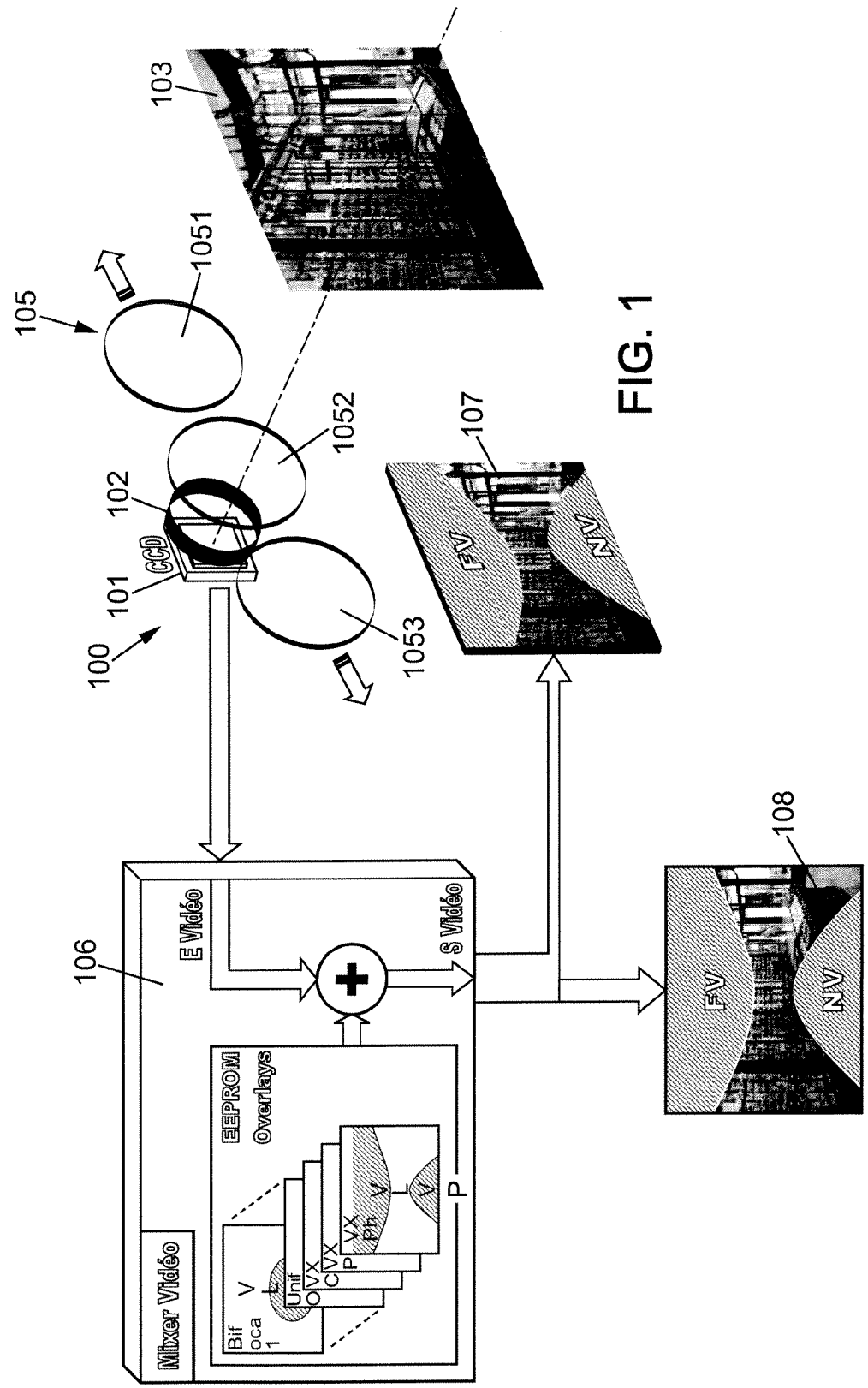
FIG. 1 is a schematic view of an apparatus for simulating the optical effect of an optical lens according to a first embodiment of the invention.

With reference to FIG. 1, the apparatus 100 for simulating the optical effect of an optical lens includes a CCD (charge coupled device) type video camera 101 provided with camera optics 102 disposed in front of the camera 101, and a plurality of optical lenses 105 supported in front of the camera optics 102 by a barrel (not shown).

The barrel houses the optical lens 105 to be tested and is arranged such that an optical lens may be interchanged manually or automatically with a different optical lens enabling one optical lens at a time to be placed in front of the camera optics 102. The barrel may hold each optical lens 105 on a circular support which is arranged to rotate to place an individual optical lens in front of the camera optics 102 or it may be of a linear form, in which lenses are placed one by one in front of the camera optics 102. The barrel may also be in the form of charger which may be replaced by another charger holding optical lenses of a different family of designs.

Figure 2A:
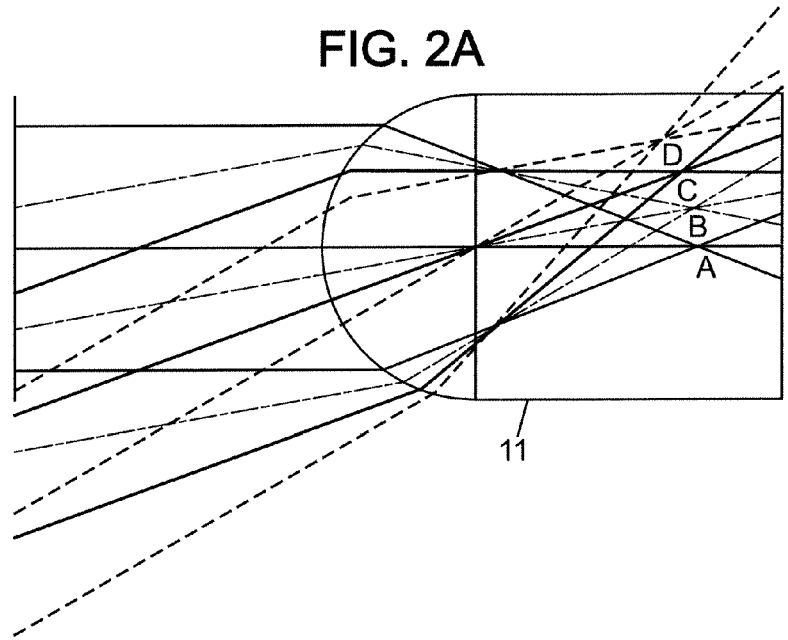
FIG. 2A is a schematic model of the optical function of a human eye.

Camera 101 is arranged to transfer image data to a processor 106 which includes an image mixer, and which transfers image data to a display device 107. Display device 107 has a screen for displaying images obtained from the camera for viewing by the potential wearer. In this embodiment the apparatus 100 includes a control monitor 108 allowing the operator to view the images being sent to the user display screen 107. The camera 101 is arranged to take an image of a real scene 103. Camera 101 is a CCD or CMOS video type camera enabling the restitution of a colour image with a VGA (video graphics array) definition of at least 640×480 pixels. It will be appreciated that in alternative embodiments of the invention different image definitions may be provided. For example a QVGA definition of 320×200 pixels may be used where, for example, a PDA is used as the display device With reference to FIGS. 2A and 2B camera optics 102 are arranged in configuration with the camera 101 to simulate the optical characteristics of a human eye in terms of pupil diameter, focal properties, field depth and viewing angle. FIG. 2A illustrates a model representation of a human eye constituted of a pupil and a lens. Points of light focalisation A, B, C and D in the eye are distributed along a curved line rather than a straight line. In the case of a real human eye this does not constitute a problem since the retina 11 of the eye is spherical. However in the case of a CCD type sensor a poor quality image could be generated. The image quality should be such to provide a foveal quality in the entire field of view. In this way the user can view a good quality image whatever the direction of vision. The camera optics system should simulate an optical pupil of approximately 5-7 mm diameter so as to provide a depth of field similar to that of an eye. To this end a camera objective lens specifically designed for CCD microcameras can be used as the camera optics 102. Camera optics 102 are scaled according to the size of the optical lenses 105 to be tested.

Figure 2B:
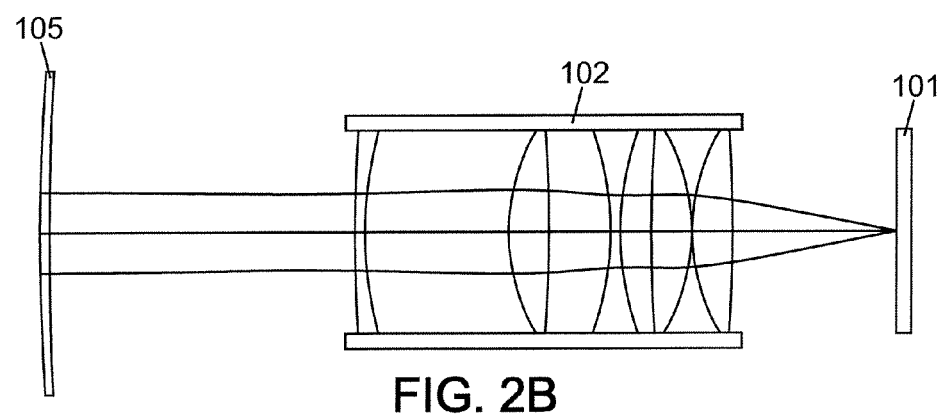
FIG. 2B is a schematic diagram of the optical set-up of the camera, camera optics and optical lens of FIG. 1.
Figure 3A:
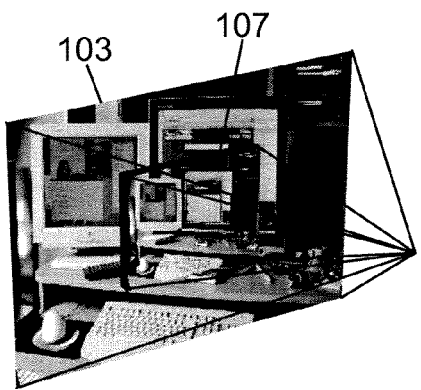
FIG. 3A illustrates the scaling of an image of a real scene.
Figure 3B:
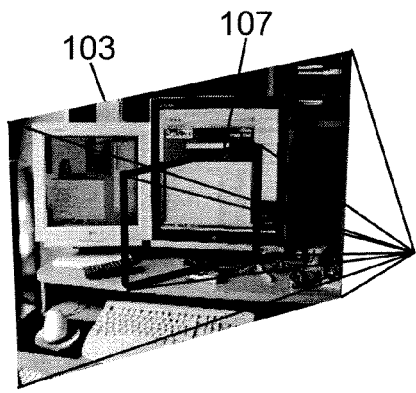
FIG. 3B illustrates the cribbing of an image of a real scene.

FIG. 2B illustrates the optical set-up including the CCD camera 101, the optics or objective 102 and the optical lens 105 being tested. Light passing through the optical lens 105 is focused by the optics 102 onto a focalisation point in the CCD camera 101. The optical set up enables a real image of a scene viewed through the optical lens 105 to be obtained.

The set of optical lens being tested includes a plurality of optical lens 1051, 1052, 1053 each having a optical characteristics according to a particular optical design. In order to provide a variety of optical effects, each design differs to the designs of the other optical lenses.

The video camera 101 provides a video stream of images. The camera 101 can be moved to scan the surrounding scene and to thereby provide a series of images of the surrounding environment. The camera may be operable to follow with movement of the user.

Processor 106 includes means for inserting or superimposing text and visual effects on the image obtained from the camera 101, and image mixer means for mixing two videos, a video and an image, combining one or more whole images together, or combining different portions of different images together. Such inserted visual features may be used to convey information associated with the particular optical lens being tested to the user to help in the testing of the optical lens.

Display device 107 may be any device suitable for viewing by a user of an image obtained from the camera 101. Preferably the display device 107 is of the portable kind providing a monocular field of view (V (vertical): +30°, −50° H (horizontal): +40° (nasal side), −50° (temporal side)) in order to provide the potential wearer with an acceptable visual sensation.

The position of the video camera 101, the optical lens being tested 1051, 1052 and 1053 and the display device 107 are fixed with respect to a referential frame defined by the head of the potential wearer (not shown), the head of the potential wearer being movable with respect to the scene 103 so that a realistic viewing of the scene 103 by movement of the head can be achieved while the viewing parameters do not vary.

Figure 4A:
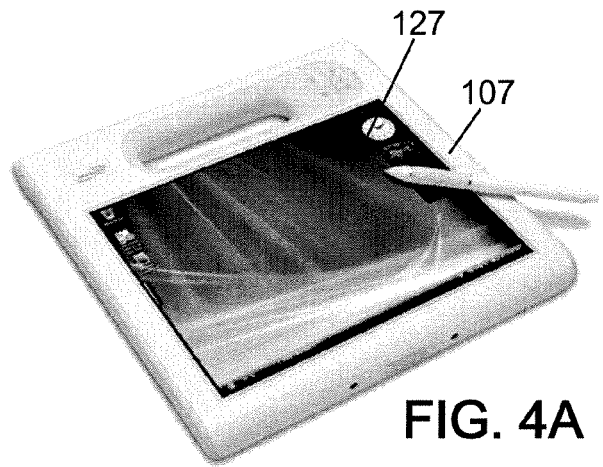
FIG. 4A is a perspective view of a display device according to the first embodiment of the invention.

The image taken by the camera 101 of the real scene 103 may be scaled to fit on the screen of the display device 107 in order that the displayed field of view correlates to the field of view of the camera 101 and optics 102 as shown in FIG. 4A. Alternatively the image may be cropped to fit the screen of display device 107 ensuring that parts of the obtained image which are relevant for testing the optical lens are included in the cropped image to be displayed on the display device 107.

Figure 4B:
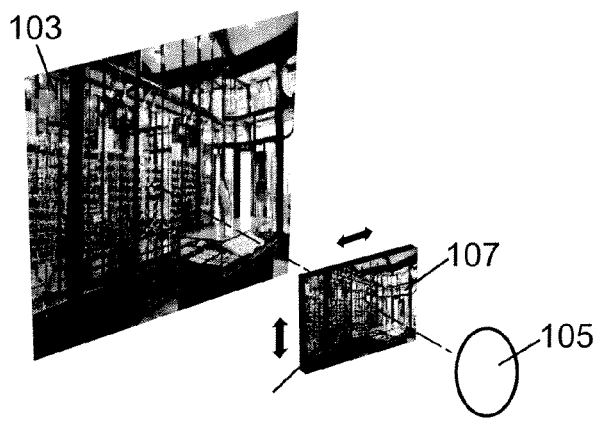
FIG. 4B illustrates the real scene and the image of the scene on the device of FIG. 4A.

In this first embodiment of the invention the display device is a touchscreen of a PC tablet as illustrated in FIG. 4A. The touchscreen 107 acts as a tool which allows interaction by both the user and the operator. The touchscreen 107 displays an image of the scene 103 viewed by camera 101 through the optical lens 105 being tested. Typically the scene being imaged by the camera is within the range of vision of the wearer testing the optical lens. The relationship between the real scene and the imaged scene on the touch screen is illustrated in FIG. 4B.

Figure 4C:
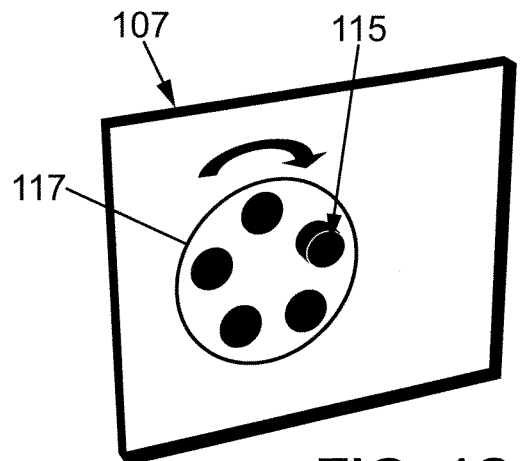
FIG. 4C is a view of a user interface on the screen of a display device according to the first embodiment of the invention.

As well as being used to display the images from the camera 101, the touchscreen may be used as a user interface. For example, as illustrated in FIG. 4C, the screen being a touch sensitive screen may be used, for example to control the simulation device to change or select the optical lens 105 being tested by means of a control feature 117 representing the barrel and a lens feature representing the optical lens 115 on the screen. Moreover text may be added manually via the screen or a keyboard input.

In use, the scene 103 is viewed by the camera 101 through the optics 102 and the lens 105 to be tested, for example lens 1052. The images captured by the video camera 101 are transferred from the camera 101 to the processor 106 where overlays may be superimposed on the images before viewing by the potential lens wearer. The image including overlays where relevant is then displayed on display device 107 for viewing by the potential wearer. The potential wearer can then assess the optical effect and resulting quality of vision that would be provided by the optical lens 1052. In the image displayed on the user screen 107 and the operator screen 108, zone FV corresponds to the far view zone of the optical lens design, i.e. the portion of the lens adapted for long distance views, NV corresponds to the near view zone, i.e. the portion of the optics adapted for near view vision.

As the camera is moved a video stream of images is provided on the display device 107 providing the potential wearer with a video view of the environment through the optical lens being tested.

The optical lens 1052 being tested may then be changed to a different optical lens 1053 having optical characteristics according to a different design. The process can then be repeated to provide the potential wearer with a stream of images taken by the camera 101 through the optics 102 and the new lens 1053. This enables the user to compare the vision quality provided by the optical lens 1053 with the vision quality provided with the optical lens 1052. The image provided through optical lens 1052 and the image provided through optical lens 1053 can be viewed sequentially or simultaneously. In the latter case, to view the images simultaneously, an image of the scene may be taken through optical lens 1052 and then stored in a memory, an image may then be taken through optical lens 1053 of the same scene, the image or part of the image taken through optical lens 1053 may then be displayed on display device 107 simultaneously with an image or the same part of an image taken through optical fens 1052. This allows the potential wearer to compare the visual effects directly.

The optical lens 105 being tested can be changed as many times as is necessary to provide the potential wearer with a range of optical effects on his or her viewing ability and enabling the potential user to make an informed selection in the choice of optical lens for his or her spectacles.

When viewing the image on display device 107 if the potential wearer uses unifocal lenses he may wear the unifocal lenses when viewing the image in order to clearly see the plane in which the image is projected. If the potential spectacle wearer wears progressive lenses it should take them off to avoid the accumulation of optical effects of two lenses.

Figure 6:
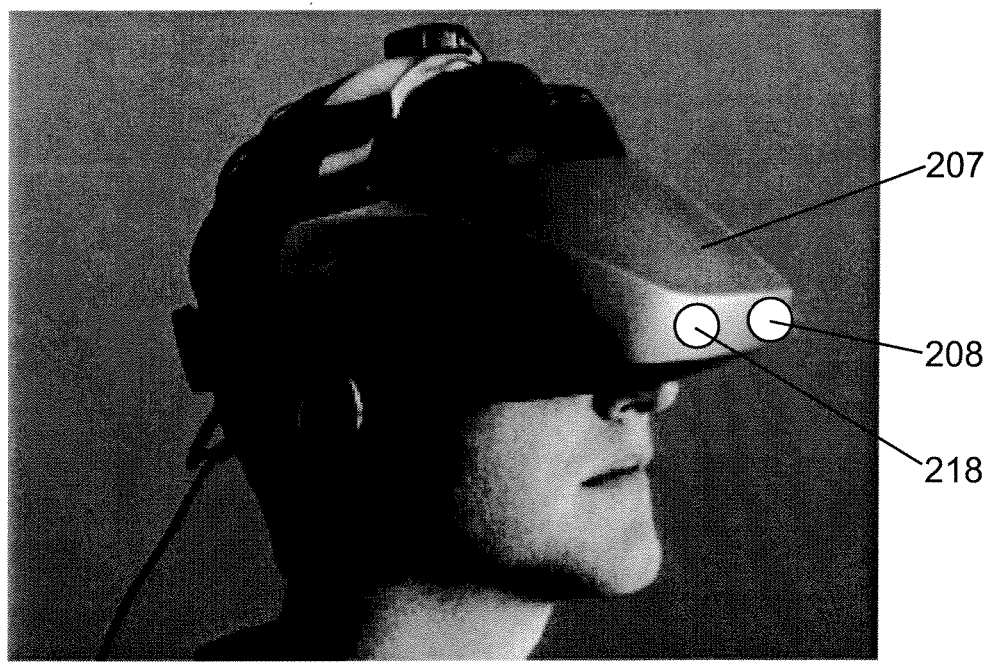
FIG. 6 is a perspective view of the display device of the second embodiment of the invention.
Figure 5:
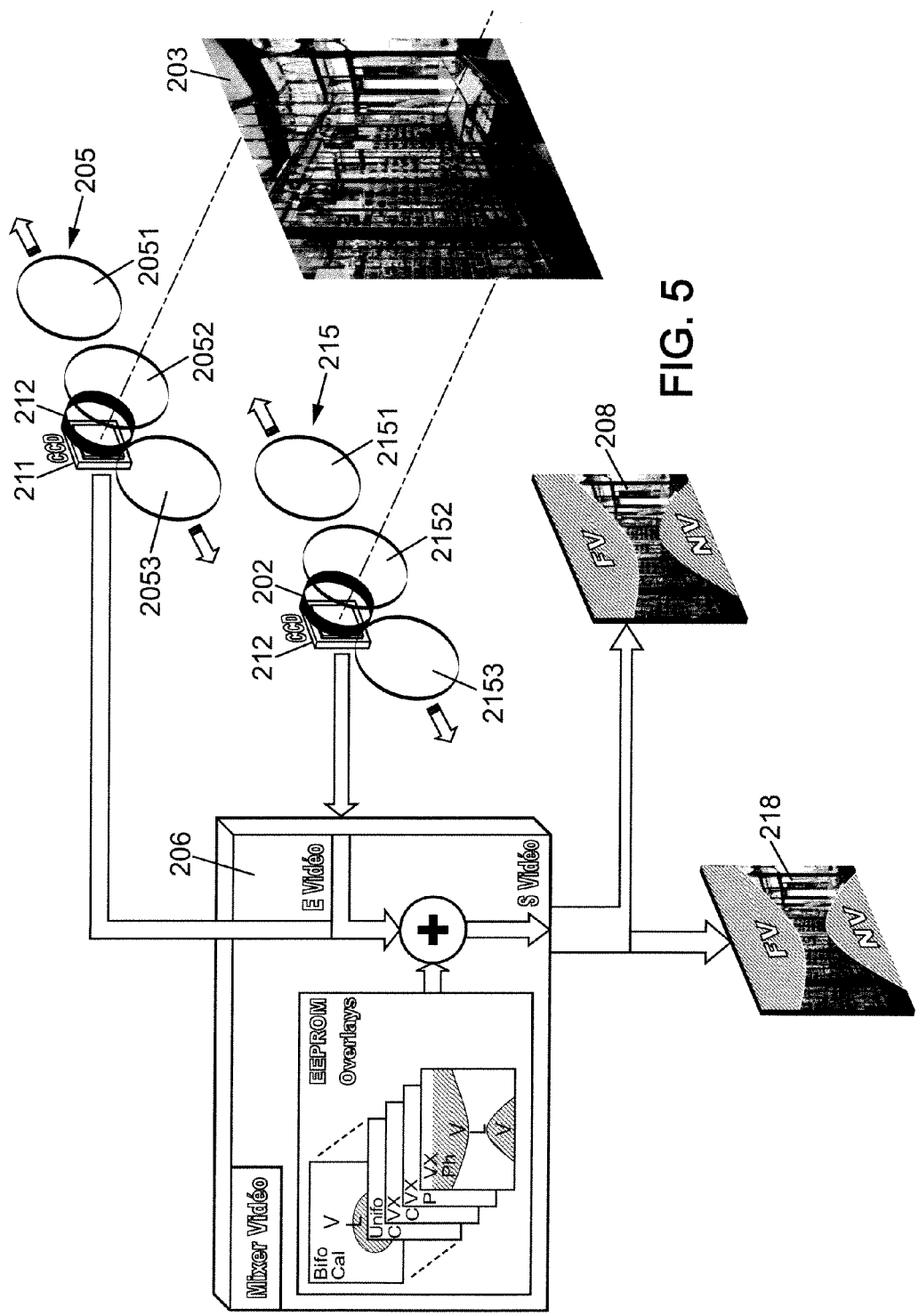
FIG. 5 is a schematic view of an apparatus for simulating the optical effect of a pair of optical lenses according to a second embodiment of the invention.

An alternative embodiment of the invention will now be described with reference to FIGS. 5 and 6. With reference to FIG. 5, the apparatus 200 for simulating the optical effects of a lens includes two CCD (charge coupled device) or CMOS type video cameras 201 and 211 each provided with camera optics 202 and 212 disposed in front of the respective camera 201 and 211, a plurality of optical lenses 205 and 215 supported in front of each camera optics 202 and 212 by a respective barrel (not shown).

The barrel for each camera 201 and 211 houses the optical lens 205 and 215 to be tested and is arranged such that the optical lens can be manually or automatically interchanged with another different optical lens enabling one optical lens at a time to be placed in front of the each camera optics 202 and 212. The barrels can be configured to simultaneously change optical lens 205 for the first camera 201 and optical lens 215 for the second camera 211.

The first camera 201 and the second camera 202 are arranged to transfer image data to a processor 206 which includes an image mixer, and which transfers image data to a display device 207 for displaying images obtained from each camera for viewing by the potential wearer.

Processor 206 includes means for inserting or superimposing text and visual effects on the images, and image mixer means for mixing two videos or a video and an image, or combining one or more whole images together or portions of different images together. Such inserted features may be used to convey information associated with the particular optical lens being tested to the user to help in the testing of the optical lens.

Each camera 201 and 211 is a CCD or CMOS type video camera enabling the restitution of a colour image with a VGA (video graphics array) definition of at least 640×480 pixels. It will be appreciated that the invention is not limited to this particular configuration of cameras, and different cameras of different resolutions may be used.

Camera optics 202 and 212 are arranged with the respective camera 201 and 211 to each simulate the optical characteristics of a human eye in terms of pupil diameter, focal properties, field depth and viewing angle. The first camera 201 and its corresponding optics 202, and the second camera 211 and its corresponding optics 212 are arranged with respect to one another and with respect to the scene to be viewed such that they simulate a pair of human eyes viewing the scene.

In this embodiment the display device is a touchscreen PC tablet similar to the display device 107 of the first embodiment as illustrated in FIG. 4A. Images of the scene 203 taken by the first camera 201 and the second camera 202 provide corresponding images 208 and 218. Images 208 and 218 may be combined by processor 206 into a single image for displaying on display device 207. Alternatively both images 208 and 218 may be displayed on display device 207. In some embodiments the device may be provided with two separate display devices for the display of respective images 208 and 218.

The sets of optical lens being tested each include a set of optical lens 2051, 2052, 2053 for camera 201 each having a optical characteristics according to a particular optical design and a set of optical lens 2151, 2152, 2153 for camera 211 each having a optical characteristics according to a particular optical design and corresponding to the optical designs of optical lens 2051, 2052 and 2053 respectively. Optical lenses of the same design are placed simultaneously in front of cameras 201 and 211.

As in the previous embodiment the pair of optical lenses 2052 and 2152 being tested may be changed to a different pair of optical lenses 2053 and 2153 having optical characteristics according to a different design. The process can then be repeated to provide the potential wearer with a stream of images taken by the cameras 201 and 211 through the optics 202 and 212 and the new lenses 2053 and 2153. This enables the user to compare the vision quality provided by the optical lenses 2053 and 2153 with the vision quality provided with the optical lens 2052 and 2152. The images provided through the pair of optical lenses 2052 2152 and the images provided through the pair of optical lenses 2053 and 2153 can be viewed sequentially or simultaneously on display device 107.

In a further embodiment the display device 207 is a head mounted display device (HMD). With reference to FIG. 6 the first camera 201 and its associated optics 202 are arranged along the axis of vision of the right eye of a user on the right side of the HMD and the second camera 211 and its associated optics 202 are arranged along the axis of vision of the left eye of a user on the left side of the HMD. The barrels holding the lens 205 to be tested are mounted in the HMD 207 in front of the respective optics 202 and 212.

The HMD 207 has two screens 208 and 218. Images of the scene 103 taken by the first camera 201 and the second camera 202 are sent to a corresponding screen 208 and 218 via the processor 206. One screen 208 is positioned in the HMD in the line of vision of the right eye of a user and displays the image taken by camera 201 positioned on the HMD in the axis of vision of the right eye of the user. The other screen 218 is positioned in the line of vision of the left eye of a user and displays the image taken by camera 211 positioned on the HMD in the axis of vision of the left eye of the user. A binocular reproduction of the scene 103 through the two cameras 201 and 211 is produced thereby providing the user with a stereoscopic view of the real scene.

The position of the cameras 201 and 211, the optical lens being tested 2052, 2152 and the display screens 208, 218 are fixed with respect to a referential frame defined by the head of the user wearing the HMD, the head of the user being movable with respect to the scene around him so that a realistic viewing of the scene by movement of the head can be achieved, while the viewing parameters do not vary. The user can thus turn his head and move around as he likes without changing the viewing parameters enabling a more accurate comparison between lens types to be achieved. Such a configuration provides a portable optical evaluation system and enables a dynamic evaluation of an optical lens to be made, taking into effect changing factors such as field range etc.

As the user moves his head, the cameras follow the movement of the head providing a video stream of images enabling the user to scan the environment around him through the optical lens 205 and 215.

As in the previous embodiment the pair of optical lenses 2052 and 2152 being tested may be changed to a different pair of optical lenses 2053 and 2153 having optical characteristics according to a different design. The process can then be repeated to provide the potential wearer with a stream of images taken by the cameras 201 and 211 through the optics 202 and 212 and the new lenses 2053 and 2153. This enables the user to compare the vision quality provided by the optical lenses 2053 and 2153 with the vision quality provided with the optical lens 2052 and 2152. The images provided through the pair of optical lenses 2052 2152 and the images provided through the pair of optical lenses 2053 and 2153 can be viewed sequentially on the respective display screens 208 and 218.

The methods of simulating of the effect of an optical lens according to embodiments of the invention enable the recreation of a real scene viewed through an optical lens and provides the following characteristics:

Reproduction of prismatic effects;
Reproduction of dioptric effects;
Wide field of view; and
Image resolution sufficient to visualise differences between two designs The use of an optical lens and camera enables the simulation of the resolution of distortion and blurring by an optical lens to be achieved in real time without the need of complex and time consuming calculations and costly processes.

Although the present invention has been described hereinabove with reference to specific embodiments, the present invention is not limited to the specific embodiments, and modifications will be apparent to a skilled person in the art which lie within the scope of the present invention.

For example, although in the preceding embodiments the camera is a CCD type video camera it will be appreciated that the camera may be any other type of camera suitable for imaging a real scene. For example, the camera may be a CMOS type camera.

Moreover, it will be appreciated that the display device may be any suitable display device for on which an image may be projected such as a portable computer screen, a PDA or the like.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method of simulating an optical effect of an optical lens for a potential wearer, the method comprising:
   using a first camera to take a first image of a scene through a first optical lens, the first optical lens having optical characteristics according to a first ophthalmic lens design, the first camera being provided with optics arranged to simulate the optical characteristics of a human eye; and
   transferring the first image to a display device so as to display the first image on the display device for viewing by the potential wearer enabling the potential wearer to visualise the optical effects of the first optical lens on his viewing ability,
   replacing the first optical lens with a further optical lens having optical characteristics according to a further ophthalmic lens design, different to the first ophthalmic lens design;
   taking a further image of the scene using the first camera through the further optical lens; and
   transferring the further image to the display device so as to display the further image on the display device for viewing by the potential wearer so that the potential wearer can compare the optical effects provided by the first optical lens with the optical effects provided by the further optical lens.

2. The method according to claim 1, further comprising:
   providing a combined image including at least a portion of the first image and at least a portion of the further image and displaying the combined image on the display device so that the wearer can compare the visual effects of the first optical lens with the visual effects of the further optical lens in the combined image.

3. The method according to claim 1, further comprising using a second camera to simultaneously take a second image of the scene through a second optical lens, the second optical lens having optical characteristics according to a second ophthalmic lens design; the second camera each being provided with optics arranged to simulate the optical conditions of a human eye such that the first and second camera simulate a pair of human eyes;
   displaying the first image on a first screen of the display device for viewing by the wearer through a first eye; and
   displaying the second image simultaneously on a second screen of the display device for simultaneous viewing by the wearer through a second eye, thereby enabling a binocular reconstruction of the first and second images.

4. The method according to claim 1, wherein the or each camera take a series of images following the movement of the head of the potential wearer to enable the potential wearer to scan the scene around him through the or each camera.

5. A computer program product for a data-processing device, the computer program product comprising a set of instructions which, when loaded into the data-processing device, causes the device to perform the steps of the method as claimed in claim 1.

6. A computer-readable medium having computer-executable instructions to enable a computer system to perform the method of claim 1.

7. The method according to claim 1, wherein the first image of the scene is stored in a memory and the first and further images are transferred to the display device so as to be displayed simultaneously.

8. The method according to claim 1, further comprising the steps of:
   displaying the first image on the display device for viewing by the potential wearer enabling the potential wearer to visualize the optical effects of the first optical lens on his viewing ability, and
   displaying the further image on the display device for viewing by the potential wearer so that the potential wearer can compare the optical effects provided by the first optical lens with the optical effects provided by the further optical lens.

9. The method according to claim 1, wherein the further image of the scene is displayed on a further screen of the display device.

10. A method of simulating an optical effect of an optical lens for a potential wearer, comprising the steps of receiving first and further images obtained by the method according to claim 1 and displaying the first and further images on a display device for viewing by the potential wearer enabling the potential wearer to visualize the optical effects of the first and further optical lens on his viewing ability.

11. An apparatus for simulating an optical effect of an optical lens for a potential wearer, the apparatus comprising:
- a first camera provided with optics arranged to simulate the optical characteristics of a human eye; and
- a first optical lens, the first optical lens having optical characteristics according to a first ophthalmic lens design, the first camera being arranged to take an image of a scene through the first optical lens and being operable to transfer image data to a display device for displaying the image for viewing by the potential wearer such that the potential wearer can visualise the effects of the first optical lens on his viewing ability,
- a further optical lens having optical characteristics according to a further design different to the first design; and
- a support for positioning the first optical lens or, alternatively, the further optical lens between the camera and the scene to be imaged.

12. The apparatus according to claim 11, further comprising:
- an image combiner operable to provide a combined image including at least a portion of the first image and at least a portion of the further image; and
- the display device being operable to display the combined image so that the wearer can compare the optical effects provided by the first optical lens with the optical effects of the further optical lens in the combined image.

13. The apparatus according to claim 11, further comprising:
- a second camera being provided with optics arranged to simulate the optical conditions of a human eye such that the first and second camera simulate a pair of human eyes; and
- a second optical lens having optical characteristics according to a second ophthalmic lens design; the second camera being arranged to simultaneously take a second image of the scene through the second optical lens;
- wherein the display device includes a first screen for displaying the first image for viewing by the potential wearer through a first eye and a second screen for displaying the second image for simultaneous viewing by the potential wearer through a second eye, thereby enabling a binocular reconstruction of the first and second images.

14. The apparatus according to claim 13, further comprising a memory arranged to store the images of the scene.

15. The apparatus according to claim 13, wherein the display device includes a first screen for displaying the first image taken through the first optical lens and a further screen for displaying the further image taken through the further optical lens.

16. The apparatus according to claim 11, wherein the or each camera is operable take a series of images following the movement of the head of the potential wearer to enable the potential wearer to scan the scene around him through the or each camera.

17. The apparatus according to claim 11, wherein the display device is a head mounted display (HMD) device or a PC tablet.

* * * * *